United States Patent
Bondarenko et al.

(10) Patent No.: US 8,322,306 B2
(45) Date of Patent: Dec. 4, 2012

(54) INDEXED FEED DISPENSING MECHANISM

(75) Inventors: Paul J. Bondarenko, Gresham, OR (US); Bryan S. Shive, Myerstown, PA (US); Leon S. Zimmerman, Lititz, PA (US); George S. Zimmerman, Lititz, PA (US); Anthony Martin, Denver, PA (US); Harry R. Van Horn, Monterey, IN (US); Andrew Rausch, Rochester, IN (US)

(73) Assignee: CTB, Inc., Milford, IN (US)

( * ) Notice: Subject to any disclaimer, the term of this patent is extended or adjusted under 35 U.S.C. 154(b) by 19 days.

(21) Appl. No.: 13/171,517

(22) Filed: Jun. 29, 2011

(65) Prior Publication Data
US 2011/0253052 A1    Oct. 20, 2011

Related U.S. Application Data

(63) Continuation of application No. 12/911,237, filed on Oct. 25, 2010, now Pat. No. 8,015,944, which is a continuation of application No. 12/463,834, filed on May 11, 2009, now Pat. No. 7,819,083, which is a continuation of application No. 11/559,210, filed on Nov. 13, 2006, now Pat. No. 7,530,328, which is a continuation-in-part of application No. 11/243,082, filed on Oct. 4, 2005, now Pat. No. 7,134,402, which is a continuation of application No. 10/898,727, filed on Jul. 23, 2004, now Pat. No. 6,976,450, which is a continuation of application No. 10/694,250, filed on Oct. 27, 2003, now Pat. No. 6,766,765, which is a continuation of application No. 10/347,815, filed on Jan. 21, 2003, now Pat. No. 6,637,368, which is a continuation of application No. 10/140,025, filed on May 7, 2002, now Pat. No. 6,526,913, which is a continuation of application No. 09/840,631, filed on Apr. 23, 2001, now Pat. No. 6,536,373, which is a continuation of application No. 09/309,839, filed on May 11, 1999, now Pat. No. 6,269,770, which is a continuation-in-part of application No. 09/007,284, filed on Jan. 14, 1998, now Pat. No. 5,921,200.

(60) Provisional application No. 60/046,048, filed on May 9, 1997.

(51) Int. Cl.
*A01K 5/00* (2006.01)
(52) U.S. Cl. ..................................................... 119/53.5
(58) Field of Classification Search ................... 119/53, 119/52.1, 53.5, 57.4, 56.1, 54, 62, 57.7, 61.1, 119/61.2
See application file for complete search history.

(56) References Cited

U.S. PATENT DOCUMENTS
7,839 A    12/1850   Hicks
(Continued)

FOREIGN PATENT DOCUMENTS
CA    2565377    2/1999
(Continued)

OTHER PUBLICATIONS
Shenandoah Hog Feeders, pp. 27-30, dated Sep. 1988.
(Continued)

*Primary Examiner* — Yvonne Abbott
(74) *Attorney, Agent, or Firm* — Harness, Dickey

(57) ABSTRACT

An improved livestock feeder provided with an adjustable feed dispensing mechanism including control levers which are operatively connected to the feed metering gates to control the flow of feed to livestock. The dispensing mechanism features a control lever which engages an array of indexing holes formed in the feeder to position the feed gate within the opening to adjust the amount of feed dispensed from the hopper. The dispensing mechanism includes a graduated scale corresponding to each of the index holes to provide a standard setting for the feeder which can be utilized by an animal producer to supply feed flow at a given stage in the animal's life cycle to obtain a desired growth rate.

20 Claims, 13 Drawing Sheets

U.S. PATENT DOCUMENTS

| | | |
|---|---|---|
| 7,926 A | 2/1851 | Thompson |
| 21,212 A | 8/1858 | Pritz |
| 21,265 A | 8/1858 | Main |
| 23,083 A | 3/1859 | Eggelston et al. |
| 41,314 A | 1/1864 | Miller |
| 59,827 A | 11/1866 | Fairchild |
| 78,833 A | 6/1868 | Rowell |
| 87,115 A | 2/1869 | Rundquist |
| 94,404 A | 8/1869 | Dickinson |
| 98,213 A | 12/1869 | Wheeler |
| 132,716 A | 11/1872 | Fairbanks |
| 158,152 A | 12/1874 | Van Brunt |
| 179,149 A | 6/1876 | Barnes |
| 183,321 A | 10/1876 | Nauman |
| 188,811 A | 3/1877 | Miller |
| 192,961 A | 7/1877 | Anderson |
| 197,085 A | 11/1877 | Bogle |
| 200,227 A | 2/1878 | Smith et al. |
| 209,670 A | 11/1878 | Dunne |
| 210,569 A | 12/1878 | Sherrill |
| 223,470 A | 1/1880 | Bogle |
| 225,156 A | 3/1880 | Miller |
| 231,823 A | 8/1880 | Licklider |
| 231,920 A | 9/1880 | Matthews |
| 233,009 A | 10/1880 | Outcalt et al. |
| 233,439 A | 10/1880 | Santrock |
| 233,517 A | 10/1880 | Jones |
| 234,845 A | 11/1880 | Baker |
| 236,067 A | 12/1880 | Nauman et al. |
| 238,149 A | 2/1881 | Otstot et al. |
| 238,970 A | 3/1881 | Sackett |
| 246,535 A | 8/1881 | Morgan |
| 254,481 A | 3/1882 | Hunt |
| 256,695 A | 4/1882 | Hunt |
| 257,820 A | 5/1882 | Horton |
| 257,971 A | 5/1882 | Nixon |
| 258,987 A | 6/1882 | Casaday |
| 260,534 A | 7/1882 | Casaday |
| 261,176 A | 7/1882 | Sanborn |
| 262,435 A | 8/1882 | Kuhns |
| 289,893 A | 12/1883 | Connett |
| 293,062 A | 2/1884 | Norris |
| 293,968 A | 2/1884 | Keller |
| 304,656 A | 9/1884 | Kivley |
| 307,160 A | 10/1884 | Alexander |
| 314,993 A | 4/1885 | Blunt |
| 338,987 A | 3/1886 | LeValley |
| 340,563 A | 4/1886 | Eberhart et al. |
| 348,204 A | 8/1886 | Greening |
| 348,399 A | 8/1886 | Johnson |
| 351,047 A | 10/1886 | Gundlach |
| 354,556 A | 12/1886 | Ladow |
| 360,765 A | 4/1887 | Dodge |
| 377,278 A | 1/1888 | Simpson |
| 379,179 A | 3/1888 | Nighswonger |
| 386,394 A | 7/1888 | Fockler |
| 455,469 A | 7/1891 | Brown |
| 495,666 A | 4/1893 | Dunks |
| 640,045 A | 12/1899 | Stokely et al. |
| 644,032 A | 2/1900 | Murray |
| 647,968 A | 4/1900 | Holt |
| 653,833 A | 7/1900 | Wilbur |
| 656,270 A | 8/1900 | Scott |
| 663,907 A | 12/1900 | Koch |
| 664,072 A | 12/1900 | Allen |
| 668,397 A | 2/1901 | Swope et al. |
| 682,956 A | 9/1901 | Sattley et al. |
| 685,946 A | 11/1901 | Roby |
| 694,499 A | 3/1902 | Smith |
| 701,641 A | 6/1902 | Stephenson |
| 716,743 A | 12/1902 | McHenry et al. |
| 720,758 A | 2/1903 | Tuck et al. |
| 722,233 A | 3/1903 | Jackson |
| 722,407 A | 3/1903 | Isham |
| 723,294 A | 3/1903 | McCollister |
| 728,492 A | 5/1903 | Norris |
| 731,845 A | 6/1903 | Blaisdell |
| 741,310 A | 10/1903 | Crotto |
| 752,618 A | 2/1904 | Fetzer |
| 755,523 A | 3/1904 | Mylor |
| 756,315 A | 4/1904 | Bain |
| 773,616 A | 11/1904 | Willson |
| 773,739 A | 11/1904 | Highsmith |
| 778,009 A | 12/1904 | Case |
| 782,733 A | 2/1905 | Ecker |
| 789,477 A | 5/1905 | Baker |
| 793,902 A | 7/1905 | Oates |
| 799,781 A | 9/1905 | Dennis |
| 806,503 A | 12/1905 | Schofield |
| 811,038 A | 1/1906 | Van Wyck |
| 817,704 A | 4/1906 | Garst |
| 842,228 A | 1/1907 | Mouser |
| 845,982 A | 3/1907 | Smith |
| 855,678 A | 6/1907 | Thurrid |
| 859,836 A | 7/1907 | Albert |
| 862,468 A | 8/1907 | Gillentine |
| 866,805 A | 9/1907 | Orrison |
| 869,335 A | 10/1907 | Staude |
| 881,131 A | 3/1908 | Kalkhurst |
| 901,620 A | 10/1908 | Jenkins |
| 938,492 A | 11/1909 | Knoblock |
| 942,868 A | 12/1909 | Stark |
| 968,526 A | 8/1910 | Bauer |
| 973,499 A | 10/1910 | Gross |
| 991,270 A | 5/1911 | Bunn |
| 992,248 A | 5/1911 | Rahner |
| 995,253 A | 6/1911 | Johns |
| 1,005,071 A | 10/1911 | Randam |
| 1,023,631 A | 4/1912 | Erickson |
| 1,026,313 A | 5/1912 | Hart |
| 1,040,337 A | 10/1912 | Hutchinson |
| 1,073,826 A | 9/1913 | Waite |
| 1,092,358 A | 4/1914 | Harden |
| 1,099,063 A | 6/1914 | Lauber |
| 1,108,150 A | 8/1914 | Dudley et al. |
| 1,112,962 A | 10/1914 | Alcorn |
| 1,138,102 A | 5/1915 | Giltner |
| 1,152,224 A | 8/1915 | Rutherford |
| 1,170,005 A | 2/1916 | Shedenhelm |
| 1,171,886 A | 2/1916 | Ray |
| 1,178,311 A | 4/1916 | Gokey |
| 1,216,419 A | 2/1917 | Dial |
| 1,226,707 A | 5/1917 | Schutt |
| 1,233,213 A | 7/1917 | Fouts |
| 1,238,212 A | 8/1917 | Stevens |
| 1,240,096 A | 9/1917 | Shoemaker |
| 1,253,621 A | 1/1918 | Martinson |
| 1,277,641 A | 9/1918 | Pierce |
| 1,289,857 A | 12/1918 | Maynard |
| 1,290,975 A | 1/1919 | Greene |
| 1,308,888 A | 7/1919 | Burgess |
| 1,321,614 A | 11/1919 | Fouts |
| 1,327,455 A | 1/1920 | Woodworth |
| 1,346,024 A | 7/1920 | Hiner et al. |
| 1,346,936 A | 7/1920 | Brown |
| 1,348,862 A | 8/1920 | Genung |
| 1,391,948 A | 9/1921 | Gledhill |
| 1,392,004 A | 9/1921 | Fouts |
| 1,392,299 A | 10/1921 | Carlson |
| 1,421,926 A | 7/1922 | Elder |
| 1,486,376 A | 3/1924 | Hassell |
| 1,516,954 A | 11/1924 | Cole |
| 1,520,696 A | 12/1924 | Campbell |
| 1,521,014 A | 12/1924 | Draver |
| 1,546,241 A | 7/1925 | Karasuda |
| 1,547,819 A | 7/1925 | Paul |
| 1,580,877 A | 4/1926 | Barber |
| 1,591,837 A | 7/1926 | Kache |
| 1,604,338 A | 10/1926 | Caughey |
| 1,628,546 A | 5/1927 | Koch |
| 1,639,203 A | 8/1927 | Varnado |
| 1,688,600 A | 10/1928 | Slifer |
| 1,695,597 A | 12/1928 | Lydon |
| 1,698,175 A | 1/1929 | Simpson |
| 1,700,738 A | 2/1929 | Kier |
| 1,701,338 A | 2/1929 | Rowles |
| 1,719,245 A | 7/1929 | Smidley |

| | | |
|---|---|---|
| 1,736,691 A | 11/1929 | Aplin |
| 1,840,602 A | 1/1932 | Pender |
| 1,842,999 A | 1/1932 | Rector |
| 1,859,625 A | 5/1932 | Laing |
| 1,868,121 A | 7/1932 | Spenst |
| 1,918,172 A | 7/1933 | Barron et al. |
| 1,919,587 A | 7/1933 | Einsel et al. |
| 1,951,534 A | 3/1934 | Schwitzer et al. |
| 2,005,896 A | 6/1935 | Hurt |
| 2,017,304 A | 10/1935 | Blackney |
| 2,041,591 A | 5/1936 | Brown et al. |
| 2,043,151 A | 6/1936 | Button |
| 2,046,089 A | 6/1936 | Rebhahn |
| 2,046,603 A | 7/1936 | Baumgardner |
| 2,069,350 A | 2/1937 | Blue |
| 2,111,950 A | 3/1938 | Thiemann |
| 2,115,167 A | 4/1938 | Hoke |
| 2,129,505 A | 9/1938 | Rosenberg |
| 2,159,554 A | 5/1939 | George |
| 2,200,773 A | 5/1940 | Finne |
| 2,204,097 A | 6/1940 | Montgomery |
| 2,221,769 A | 11/1940 | Hipple |
| 2,231,342 A | 2/1941 | Loyless |
| 2,237,504 A | 4/1941 | Roath |
| 2,244,480 A | 6/1941 | Arndt |
| RE21,949 E | 11/1941 | White |
| 2,271,450 A | 1/1942 | Aleshire |
| 2,290,042 A | 7/1942 | Granville |
| 2,290,712 A | 7/1942 | Robinson |
| 2,318,064 A | 5/1943 | Delaney |
| 2,323,995 A | 7/1943 | Hiroshima |
| 2,334,598 A | 11/1943 | Bateman et al. |
| 2,336,441 A | 12/1943 | Paul |
| 2,350,107 A | 5/1944 | Ganrud |
| 2,416,804 A | 3/1947 | Ulrich |
| 2,432,437 A | 12/1947 | Murphy |
| 2,494,950 A | 1/1950 | Lee |
| 2,508,195 A | 5/1950 | Seaman et al. |
| 2,522,635 A | 9/1950 | Pittenger et al. |
| 2,527,862 A | 10/1950 | Walz et al. |
| 2,541,008 A | 2/1951 | Stahmer et al. |
| 2,605,935 A | 8/1952 | Huitema |
| 2,626,083 A | 1/1953 | Masters |
| 2,640,464 A | 6/1953 | Jindrich |
| 2,661,800 A | 12/1953 | Reichenbach |
| 2,687,891 A | 8/1954 | Puckette |
| 2,699,337 A | 1/1955 | Best |
| 2,710,116 A | 6/1955 | Juzwiak |
| 2,772,038 A | 11/1956 | Morrissey |
| 2,778,535 A | 1/1957 | Seltzer |
| 2,787,404 A | 4/1957 | Vandenberg et al. |
| 2,812,108 A | 11/1957 | Chatfield |
| 2,834,320 A | 5/1958 | Tolley |
| 2,840,271 A | 6/1958 | Liljenberg |
| 2,892,571 A | 6/1959 | Christenson et al. |
| 2,902,003 A | 9/1959 | Munf |
| 2,914,023 A | 11/1959 | St. Pierre |
| 2,966,135 A | 12/1960 | Kelley et al. |
| 2,974,634 A | 3/1961 | Williams et al. |
| 3,035,545 A | 5/1962 | Mayo |
| 3,066,649 A | 12/1962 | Geerlings |
| 3,093,947 A | 6/1963 | Whitman |
| 3,102,511 A | 9/1963 | Atcheson |
| 3,121,515 A | 2/1964 | Johnson et al. |
| 3,217,474 A | 11/1965 | Neilson |
| 3,224,636 A | 12/1965 | Atkinson |
| 3,249,090 A | 5/1966 | Ripley |
| 3,388,690 A | 6/1968 | Hostetler |
| 3,755,998 A | 9/1973 | Hoffmeyer |
| 3,800,746 A | 4/1974 | Stidham |
| 3,811,412 A | 5/1974 | Murto et al. |
| 3,920,224 A | 11/1975 | Fassauer |
| 3,935,838 A | 2/1976 | Johnson |
| 4,121,733 A | 10/1978 | McRoskey et al. |
| 4,184,610 A | 1/1980 | Thiele et al. |
| 4,200,060 A | 4/1980 | Van Daele |
| 4,242,985 A | 1/1981 | Freeborn |
| 4,278,049 A | 7/1981 | Van Dusseldorp |
| 4,306,518 A | 12/1981 | Herring |
| 4,315,484 A | 2/1982 | Kingery |
| 4,348,988 A | 9/1982 | Lawson |
| 4,351,274 A | 9/1982 | Pannier |
| 4,377,130 A | 3/1983 | Schwieger |
| 4,385,591 A | 5/1983 | Petersen |
| 4,444,151 A | 4/1984 | Bohlmann |
| 4,462,338 A | 7/1984 | Thibault |
| 4,491,087 A | 1/1985 | Herring, Sr. |
| RE31,939 E | 7/1985 | Van Dusseldorp |
| 4,582,023 A | 4/1986 | Zumbahlen et al. |
| 4,660,508 A | 4/1987 | Kleinsasser et al. |
| 4,911,727 A | 3/1990 | King |
| 4,947,798 A | 8/1990 | De Wispelaere |
| 5,007,380 A | 4/1991 | Badia et al. |
| 5,010,849 A | 4/1991 | Kleinsasser |
| 5,036,798 A | 8/1991 | King |
| 5,069,164 A | 12/1991 | Wiwi |
| 5,092,274 A | 3/1992 | Cole et al. |
| 5,097,797 A | 3/1992 | Van Zee et al. |
| 5,230,301 A | 7/1993 | Nass |
| 5,245,949 A | 9/1993 | Hively |
| 5,345,894 A | 9/1994 | Evans, III et al. |
| 5,351,649 A | 10/1994 | Badia et al. |
| 5,495,826 A | 3/1996 | Lindbloom et al. |
| 5,558,039 A | 9/1996 | Zimmerman |
| 5,570,656 A | 11/1996 | Waldner et al. |
| 5,595,139 A | 1/1997 | Hofer et al. |
| 5,603,285 A | 2/1997 | Kleinsasser |
| 5,606,934 A | 3/1997 | Brisby |
| 5,640,926 A | 6/1997 | Kleinsasser |
| 5,749,315 A | 5/1998 | Barenwald |
| 5,862,777 A | 1/1999 | Sweeney |
| 5,921,200 A | 7/1999 | Bondarenko et al. |
| 6,253,705 B1 | 7/2001 | Pollock et al. |
| 6,269,770 B1 | 8/2001 | Bondarenko et al. |
| 6,526,913 B2 | 3/2003 | Bondarenko et al. |
| 6,536,373 B1 | 3/2003 | Bondarenko et al. |
| 6,637,368 B2 | 10/2003 | Bondarenko et al. |
| 6,766,765 B2 | 7/2004 | Bondarenko et al. |
| 6,923,142 B2 | 8/2005 | Kleinsasser |
| 6,976,450 B2 | 12/2005 | Bondarenko et al. |
| 7,134,402 B2 | 11/2006 | Bondarenko et al. |
| 7,530,328 B2 | 5/2009 | Bondarenko et al. |
| 7,819,083 B2 | 10/2010 | Bondarenko et al. |

FOREIGN PATENT DOCUMENTS

| | | |
|---|---|---|
| CA | 2452148 | 6/2005 |
| CA | 2569587 | 6/2008 |

OTHER PUBLICATIONS

Osborne Feeders, 12 pages, dated Sep. 1988.
Hog WLC Company, Inc., 2 pages, dated Sep. 1988.
Ideal Stainless Steel Confinement Feeders, 2 pgs., dated Sep. 1988.
Brower Hog Feeders, 2 pgs., dated Sep. 1988.
Round (Feed.Saver) Hole Stainless Steel Feeders, Modern Hog Concepts, 2 pgs., dated Sep. 1988.
The Feed Saver, Schouten Feeders, Inc. 2 pgs., dated Sep. 1988.
Pride of the Farm Automatic Waterers and Feeders, 32 pgs., Copyright 1967.

INDEXED FEED DISPENSING MECHANISM

CROSS-REFERENCE TO RELATED APPLICATIONS

This application is a continuation of U.S. Ser. No. 12/911,237, filed Oct. 25, 2010, which is a continuation of U.S. Ser. No. 12/463,834, filed May 11, 2009, now U.S. Pat. No. 7,819,083, issued Oct. 26, 2010; which is a continuation of U.S. Ser. No. 11/559,210, filed on Nov. 13, 2006, now U.S. Pat. No. 7,530,328, issued May 12, 2009; which is a continuation-in-part of U.S. Ser. No. 11/243,082, filed on Oct. 4, 2005, now U.S. Pat. No. 7,134,402 issued on Nov. 14, 2006; which is a continuation of U.S. Ser. No. 10/898,727, filed on Jul. 23, 2004, now U.S. Pat. No. 6,976,450 issued on Dec. 20, 2005; which is a continuation of U.S. Ser. No. 10/694,250, filed on Oct. 27, 2003, now U.S. Pat. No. 6,766,765 issued on Jul. 27, 2004; which is a continuation of U.S. Ser. No. 10/347,815, filed on Jan. 21, 2003, now U.S. Pat. No. 6,637,368 issued on Oct. 28, 2003; which is a continuation of U.S. Ser. No. 10/140,025, filed on May 7, 2002, now U.S. Pat. No. 6,526,913, issued on Mar. 4, 2003; which is a continuation of U.S. Ser. No. 09/840,631, filed Apr. 23, 2001, now U.S. Pat. No. 6,536,373, issued on Mar. 25, 2003; which is a continuation of U.S. Ser. No. 09/309,839, filed May 11, 1999, now U.S. Pat. No. 6,269,770, issued on Aug. 7, 2001; which is a continuation-in-part of U.S. Ser. No. 09/007,284, filed Jan. 14, 1998, now U.S. Pat. No. 5,921,200, issued Jul. 13, 1999, which claims priority of U.S. Provisional Application No. 60/046,048, filed May 9, 1997. The disclosures of the above applications are incorporated herein by reference.

FIELD OF THE INVENTION

The present invention relates to animal feed dispensers and, more particularly, to an indexed feed mechanism for selectively positioning the feed gate in one of a plurality of discrete feed gate positions.

BACKGROUND OF THE INVENTION

All conventional gravity type feeders utilize so-called feed gates to regulate the flow of feed from a hopper to the animals. These feed gates are usually adjusted by some type of threaded adjusting mechanism to control the flow of feed. The threaded adjusting mechanisms found in hog feeders on the market today offer no means of accurately determining the flow of feed being dispensed. If the gate is open too much, more feed will be dispensed than the animals can eat and the excess feed is wasted. On the other hand, if the gate is not open enough, the animals will not get the amount of food necessary for optimum growth. To compound the matter, as the animals grow larger, they need more food to continue optimal growth.

To adjust conventional feeders correctly to obtain optimum performance requires a certain amount of guesswork. Because adjusting the feeders is difficult and very labor intensive, many feeders are simply not adjusted properly, resulting in feed waste or poor animal growth rate as discussed above.

In addition, standardized agricultural practices require regular cleaning and disinfecting of livestock feeders. Typically the cleaning process entails washing the feeders with high pressure water hoses. Cleaning fluids, animal waste and leftover waste grain often remain trapped in the trough of the feeder. One way to remove the cleaning fluids from a conventional feeder is tilting the feeders back and forth to displace the fluids. Further, conventional feeders often have defined flanges and structures, which trap food and dirt, making cleaning and disinfecting with high pressure hoses difficult.

The present invention solves these problems by providing an improved feeder having a precise feed dispensing mechanism with standardized indicia to eliminate the guesswork from dispensing feed to the livestock.

The advantages provided by the present invention are that animal producers can control proper feed adjustment based on animal weight, feed type, number of animals, etc. Producers can also mandate a standard setting for all feeders for any given circumstance thereby ruling out potential variables in animal production.

Another advantage to the present invention is that routine adjustments to the feed dispensing mechanism can be accomplished simply and the feed gates can be quickly and fully opened for cleaning.

The dispensing mechanism of the present invention is user friendly, the index scale of 1 to 10 is easily read and understood, a direct acting index lever correlates to feed gate movements either upwardly or downwardly, the indexing lever and connecting rods are replaceable and the unique connecting rod attaches to the feed gate without bolts or welding.

Another advantage of the present invention is to provide a closable cleaning gate that allows cleaning fluids and waste food grains to be easily removed from the entire feeder. Further, the invention additionally provides an improved flange structure, which facilitates cleaning, increased strength as well as minimizes discomfort to the feeding animals.

A dust cover is included which makes the feeder of the present invention environmentally safe by preventing large amounts of dust from becoming airborne when a feeder is being filled by an automatic delivery system.

In addition to the above, the improved feeder of the present invention includes a feed drop tube holder similar to that shown in U.S. Pat. No. 5,558,039 to adapt it for use with an automatic feed delivery system.

DESCRIPTION OF THE RELATED ART

U.S. Pat. No. 5,558,039 to Leon S. Zimmerman discloses a livestock feeder for use with an automatic feed delivery system having a feed drop tube operatively connected thereto for dispensing feed into a feed bin. This feeder features a feed drop tube holder fabricated from a flexible, resilient material which is installed intermediate the opposed side walls of the feed bin by compressing the holder lengthwise with hand pressure to effectively reduce its overall length and to allow tabs formed on the ends thereof to engage a plurality of horizontally opposed slots formed in the opposed side walls.

SUMMARY OF THE INVENTION

After much research and study of the above described problems, the present invention has been developed to provide an improved livestock feeder including a feed dispensing mechanism which accurately controls the flow of feed to the animals for consumption. The improved feeder utilizes a pair of adjustable feed gates installed in the lower portion of a gravity feed bin formed by downwardly converging side walls. The feed gates are mechanically coupled by connecting rods to the feed dispensing controls which are accessible from the open top of the feed bin.

The controls for the feed dispensing mechanism are provided with a lever that engages a standard index of positions that adjust the opening of the feed gates. By use of the controls, animal producers may obtain a standardized setting for the release of feed to animals at different stages of the life cycle to obtain optimum growth rates.

In the preferred embodiment, the dispensing mechanism and controls are utilized with a hog feeder of the type disclosed in U.S. Pat. No. 5,558,039 which has previously issued to the Applicant herein.

In view of the above, it is an object of the present invention to provide an improved livestock feeder having a precision dispensing mechanism that will accurately control the release of feed to livestock.

Another object of the present invention is to provide an improved livestock feeder that will permit animal producers to obtain standardized settings for the release of feed to numerous animals at a particular stage in the production cycle.

Another object of the present invention is to provide an improved livestock feeder that will reduce variations in growth rate between animals by insuring the controlled release of food thereto.

Another object of the present invention is to provide an improved livestock feeder including a removable dust cover which is installed across the top opening of the feeder to reduce the release of airborne dust generated by an automatic feed delivery system.

Another object of the present invention is to provide a livestock feeder which facilitates cleaning.

Another object of the current invention is to provide a livestock feeder with improved flanges which provide for greater animal comfort as well as easy cleaning.

Other objects and advantages of the present invention will become apparent and obvious from a study of the following description and the accompanying drawings which are merely illustrative of such invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

Figure 1:
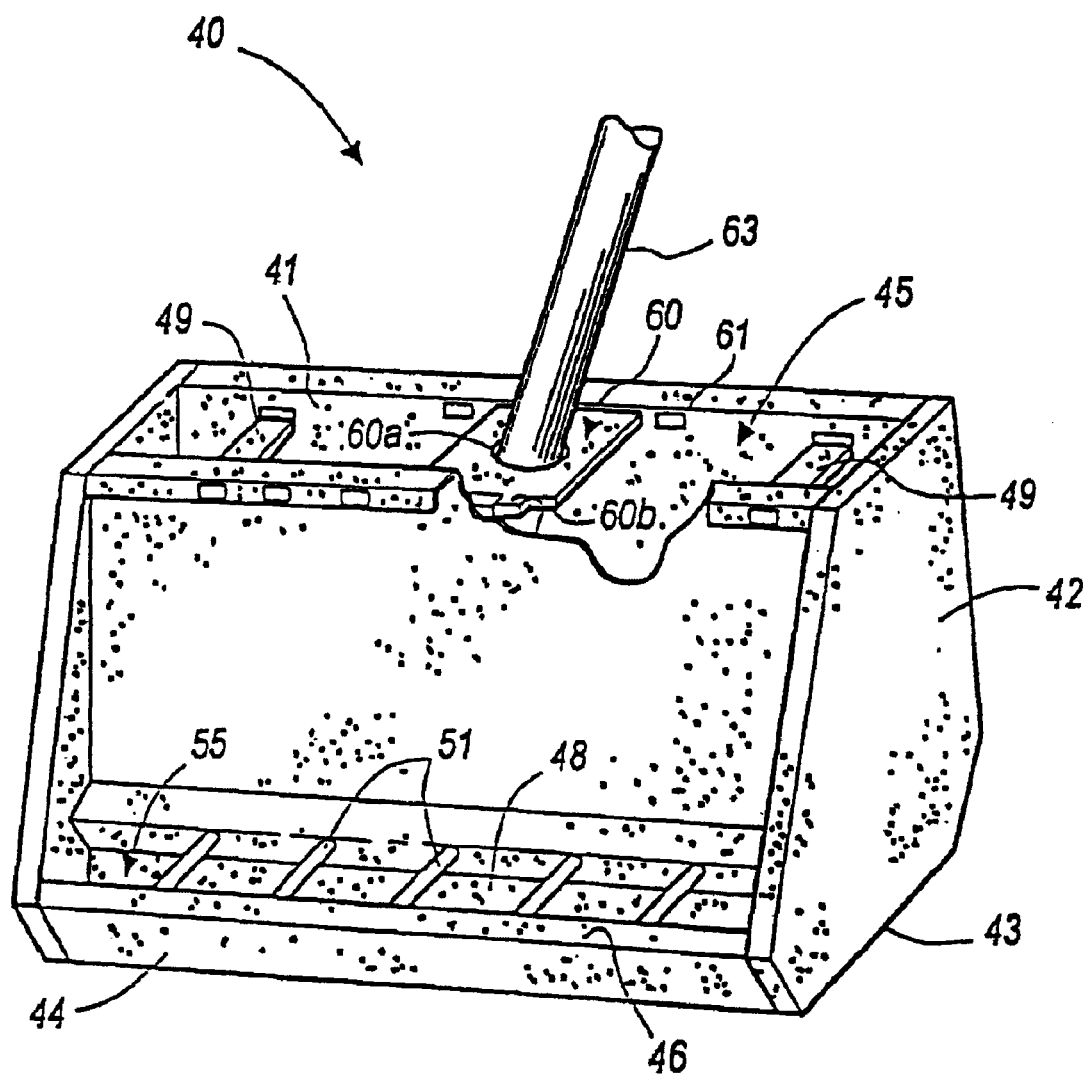
FIG. 1 is a perspective view of a livestock feeder of the prior art.

As background and to better understand by comparison the improved livestock feeder of the present invention, reference should be made to animal feeder illustrated in FIG. 1 and labeled Prior Art.

The prior art animal feeder, indicated generally at 40, comprises an open-topped hopper, indicated generally at 45, defined by opposing, downwardly sloping side walls 41 and opposing substantially vertical end walls 42.

The opposing end walls 42 are of generally rectangular shape and their upper edges are preferably positioned on substantially the same level as the upper edges of the downwardly sloping side walls 41. The lower edges of the opposing end walls 42 terminate at a substantial distance below the lower edges of the opposing side walls 42 and are suitably secured to opposed ends of a bottom wall 43.

The bottom wall 43 is connected to upwardly and outwardly inclined outer panel portions 44 forming elongate feed troughs, indicated generally at 55, along opposite sides of the animal feeder 40 and below the opposing side walls 41.

The lower portions of the downwardly converging side walls 41 and the bottom wall 43 define therebetween a feed discharge opening 16.

As another element of the Prior Art feeder 40, reinforcing dividers, shown in the form of plurality of spaced-apart, elongate rods 57 span the feed troughs 55 from the side walls 41 to the respective outer trough portions 44 of the bottom wall 43. The rods 57 reinforce the feed bin and divide each feed trough 55 into individual feeding areas which serve to aid in giving the livestock animals access to feed.

As another element of the Prior Art feeder 40, a pair of elongate, pivotally mounted, vertically adjustable gates 48 including gate adjustment means 49 mechanically coupled thereto overlie the respective feed discharge openings 46 for varying the size of each opening 46. The gates 48 extend longitudinally between the end walls 42 with the opposite ends of the gates 48 terminating closely adjacent end walls 42. A small clearance remains necessary between the ends of the gates 48 and the end walls 42 so that the gates 48 may pivot freely in their described adjusted positions. The gate 48, which functions to regulate the amount of food into the trough, is shown as a flat rectangular plate. It is envisioned that gate 48, can take the form of other shapes such as circular or conical.

Another element of the Prior Art feeder 40 is the feed drop tube holder, indicated generally at 60, as shown in FIG. 1. The feed drop tube holder 60 is a generally flat, rectangular structure having a circular opening 60a in the center thereof.

Holder 60 includes a plurality of tabs 60b integrally formed on opposite ends thereof at predetermined intervals. Tabs 60b are adapted to engage a plurality of cooperating slots 61 which are disposed about the upper peripheral edges of side walls 41 at regular intervals.

One of the principle advantages of the feed drop tube holder 60 is that it does not require brackets for additional hardware to install. Holder 60 is manufactured to an overall length that is slightly larger than the inside dimension between the opposing side walls 41 as measured in a plane coincidental with slots 61.

Being made of a flexible, resilient material holder 60 may be compressed lengthwise by hand pressure into a curved bow shape in order to insert tab 60b into cooperating slot 61.

Once released from this position, holder 60 springs back into its original flat configuration such that tabs 60b project outwardly through slots 61 in side walls 41 retaining holder 60 therebetween.

The central opening 60a in holder 60 is sized to a dimension that is slightly larger than the feed drop tube 63 to accommodate the insertion of the same into central openings 60a at varying angles without binding therein.

It will be appreciated by those skilled in the art that holder 60 may be easily repositioned to several longitudinal positions within feeder 40 by removing and replacing holder 60 to a different grouping of opposed slots 61 as desired.

Since all of the above described features of feeder 40 are well known to those skilled in the art, further detailed discussion of the same is not deemed necessary.

Figure 2:
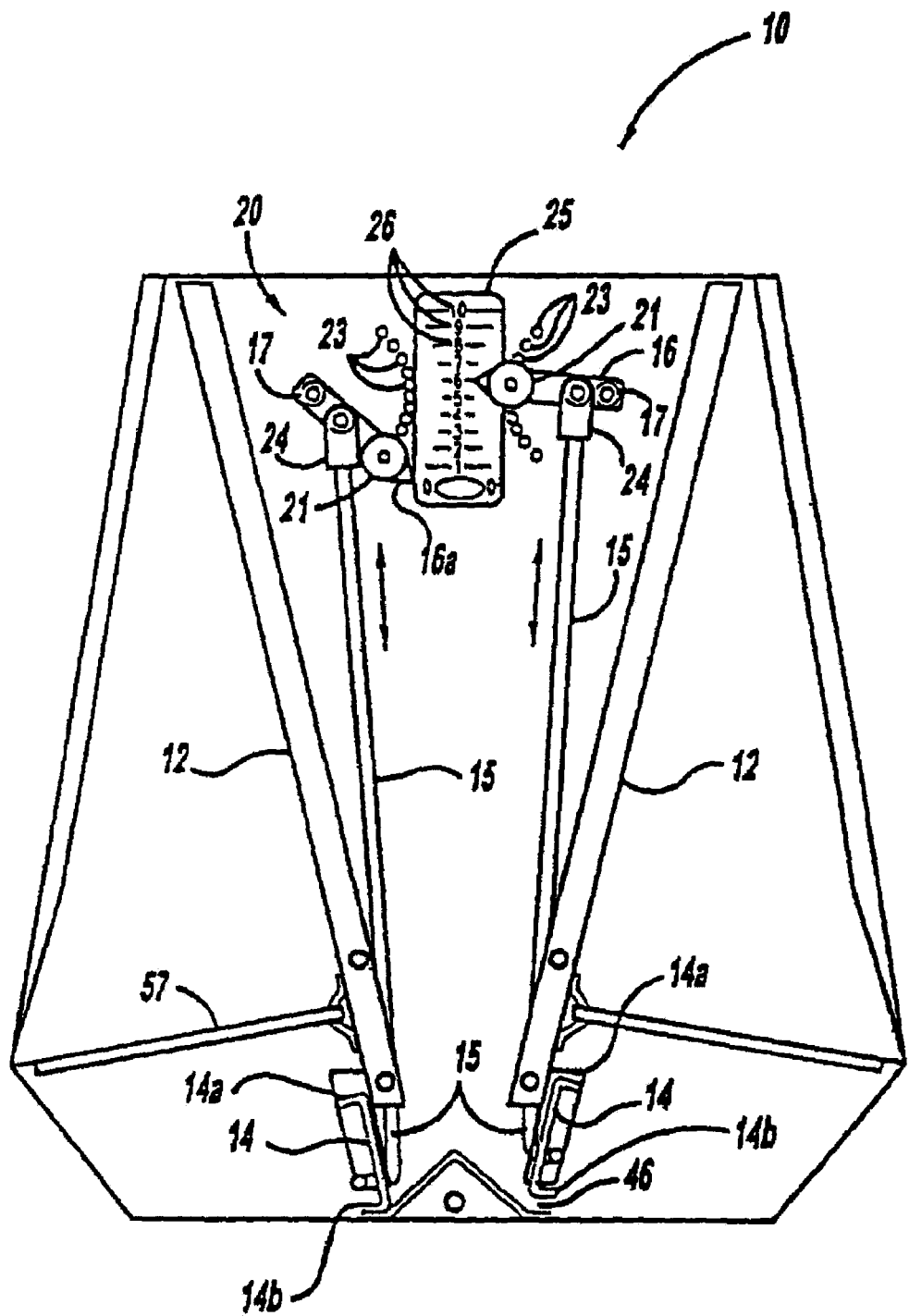
FIG. 2 is a cross-sectional view of the improved feeder of the present invention showing the feed-dispensing mechanism thereof.

One of the principle improvements of the animal feeder 10 of the present invention is the feed dispensing mechanism, indicated generally at 20 comprising a pair of control levers 16 with associated indexing holes 23, a scale 25 with numeric indicia 26, control rods 15 and feed gates 14 as shown in FIG. 2. The feed gates 14 have projections 14a, 14b extending outwardly from feed discharge opening 16.

The structure and function of these components will now be described in further detail. It will be understood that a dispensing mechanism as depicted in FIG. 2 is installed on the interior surface of each end wall 11 of the present feeder 10 to operate the vertically adjustable feed gates 14 thereof.

Figure 3:
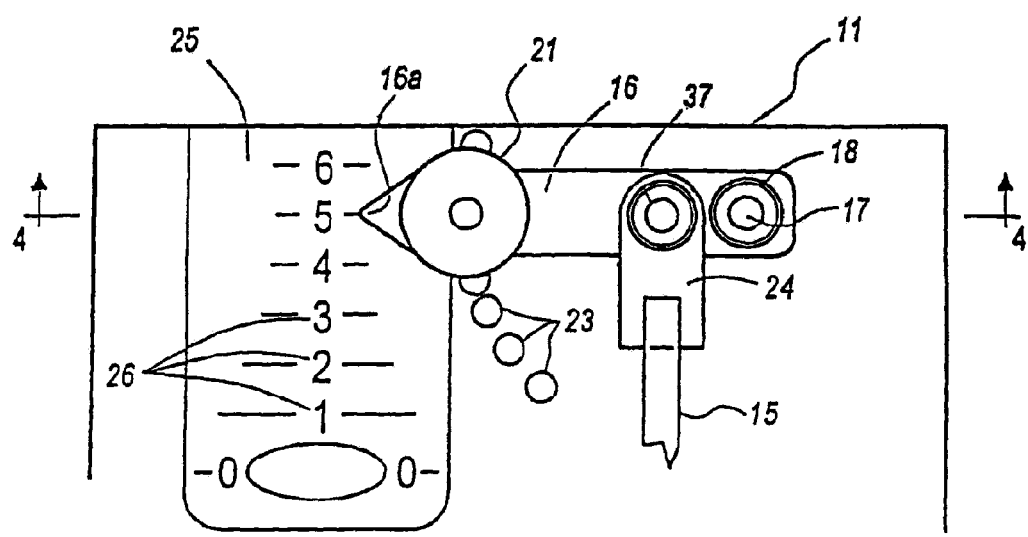
FIG. 3 is an enlarged view of the feed dispensing controls.
Figure 4:
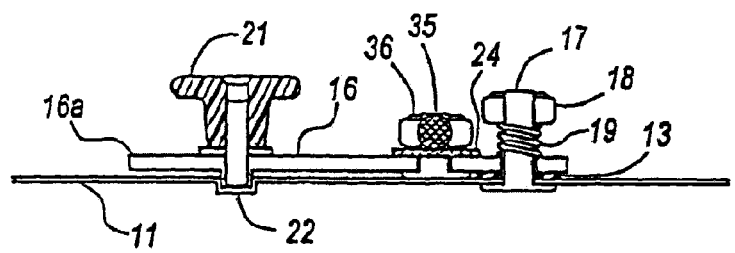
FIG. 4 is a sectional view taken through section 4-4 of FIG. 3.

A pair of adjustable control levers 16 are pivotally mounted on the interior surface of each end wall 11 by use of suitable attaching hardware such as a pivot screw 17, lock washer 18, spacer 13 and compression spring 19 as seen in FIGS. 3 and 4.

An opposite end of the control lever 16 includes a pointer 16a for indicating the setting for the feed gates 14 as described hereinafter in further detail.

The pointer 16a is provided with a knob 21 including an index pin 22 projecting outwardly therefrom for mating engagement with an array of index holes 23 which are radially disposed at regular intervals along an arc concentric with an axis of the pivot screw 17 as seen in FIGS. 3 and 4.

Intermediate the pivot screw 17 and the knob 21 an upper end of a connecting rod 15 is secured using suitable attaching hardware. In the preferred embodiment a connecting tab 24 having an elongated slot 37 formed at one end thereof is coupled to the upper end of connecting rod 15. The tab 24 is mounted on a connecting bolt 35 which loosely penetrates the slot 37 and is secured thereon by lock nut 36.

Figure 5:
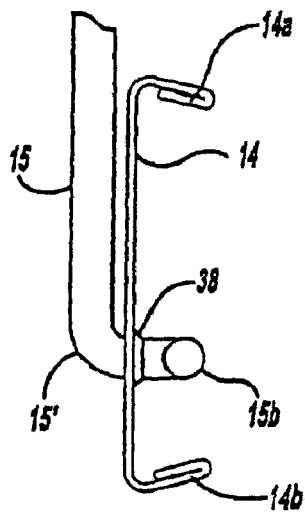
FIG. 5 is a cross-sectional view of the feed gate showing the manner in which the connecting rod is attached thereto.
Figure 6:
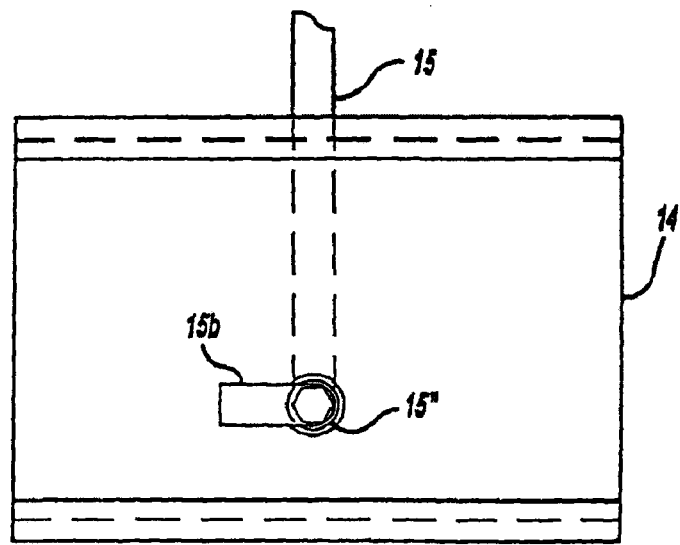
FIG. 6 is a side elevational view of the connecting rod and feed gate.
Figure 7:
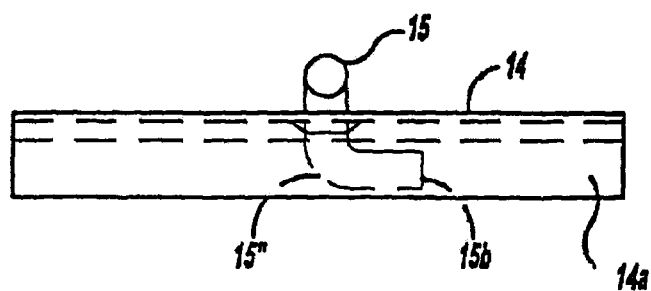
FIG. 7 is a top sectional view of the lower portion of a connecting rod.

An opposite end of each connector rod 15 is configured as illustrated in FIGS. 5-7. The lower most end of the connector rod 15 is initially bent at 90° to a longitudinal axis thereof as at 15 in FIG. 5 so as to lie in a plane coincident with the major portion of the rod 15. Thereafter the tip portion 15b is again bent 90° as at 15 to lie in a plane perpendicular to the longitudinal axis of the major portion of the rod 15 as shown in FIG. 6.

To install the connector rod 15 in the feed gate 14 the tip portion 15b is inserted through mounting aperture 38 as seen in FIG. 5 attaching the rod 15 to the feed gate 14 without bolting or welding the connection. Thus installed, it will be appreciated that a non-binding linkage is provided between the rod 15 and the gate 14 to facilitate operation of the dispensing mechanism when the feeder is filled to capacity.

Figure 8:
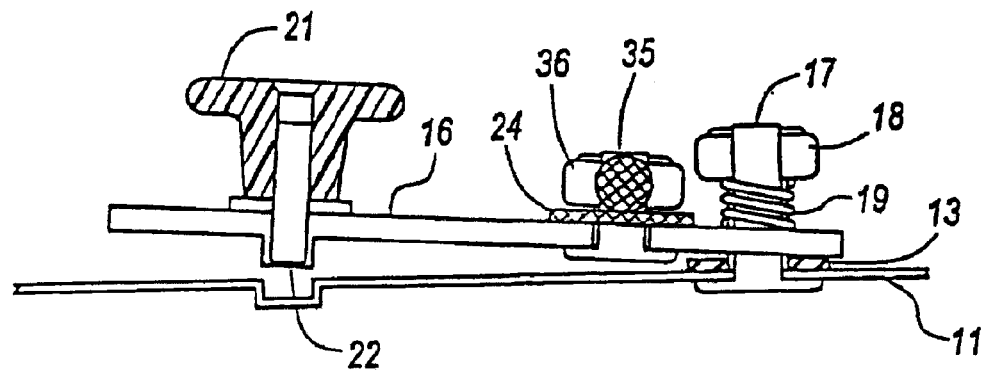
FIG. 8 is a sectional view showing the control lever in a position of disengagement with an indexing hole.
Figure 9:
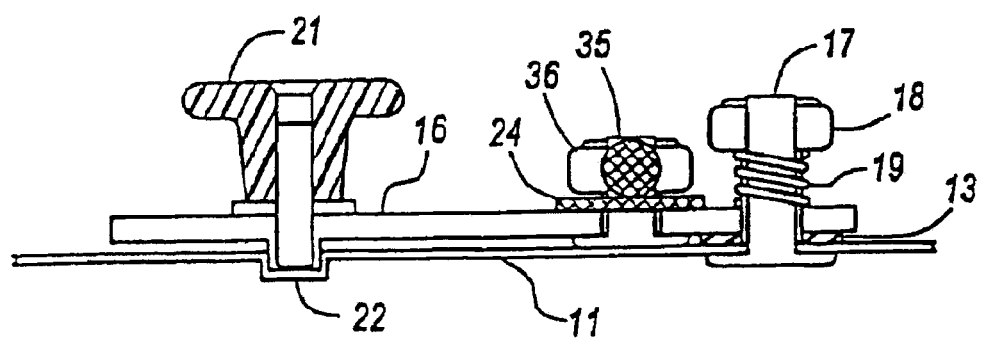
FIG. 9 is a sectional view showing the control lever in a position of engagement with an indexing hole.

In normal operation the user of the improved feeder 10 adjusts the dispensing mechanism 20 by grasping and pulling the knob 21 outwardly from an engaged position as shown in FIG. 8 and pivoting the lever 16 upwardly or downwardly to adjust the gate 14 to the desired vertical position. After the desired position or hole 23 is selected, the knob 21 is again released to the position shown in FIG. 9.

It will be appreciated that each respective indexing hole 23 corresponds to numeric indicia 26 on the scale 25 so as to dispense feed at a predetermined rate to livestock eating from the feeder 10. In this manner several feeders 10 can be utilized in a livestock production facility to deliver a predetermined amount of feed to animals at any stage of the life cycle using the standard settings on the scale 25.

It will also be noted that a feeder 10 can be disposed between adjacent pens in such a production facility and adjusted to deliver feed in different amounts from opposite sides of the feeder 10. Thus, the improved feeder of the present invention provides significant advantages to animal producers which are unknown in the prior art.

Figure 10:
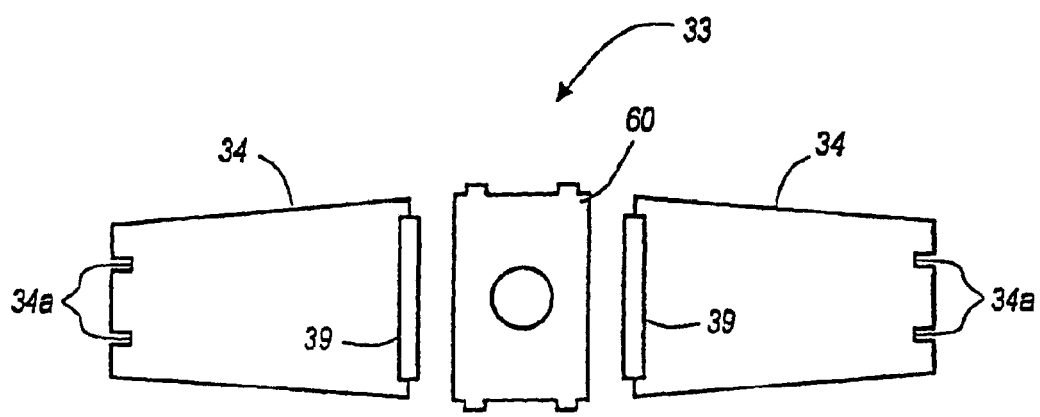
FIG. 10 is a top plan view of the dust cover panels.

Further, the physical location of the dispensing mechanisms 20 on the interior end walls 11 of the feeder rather than on lateral brace members 47 extending across the hopper 45 as shown in FIG. 1 lends itself to another principle advantage of the present invention. The improved feeder 10 is provided with a removable dust cover, indicated generally at 33 as shown in FIGS. 10-12.

Figure 11:
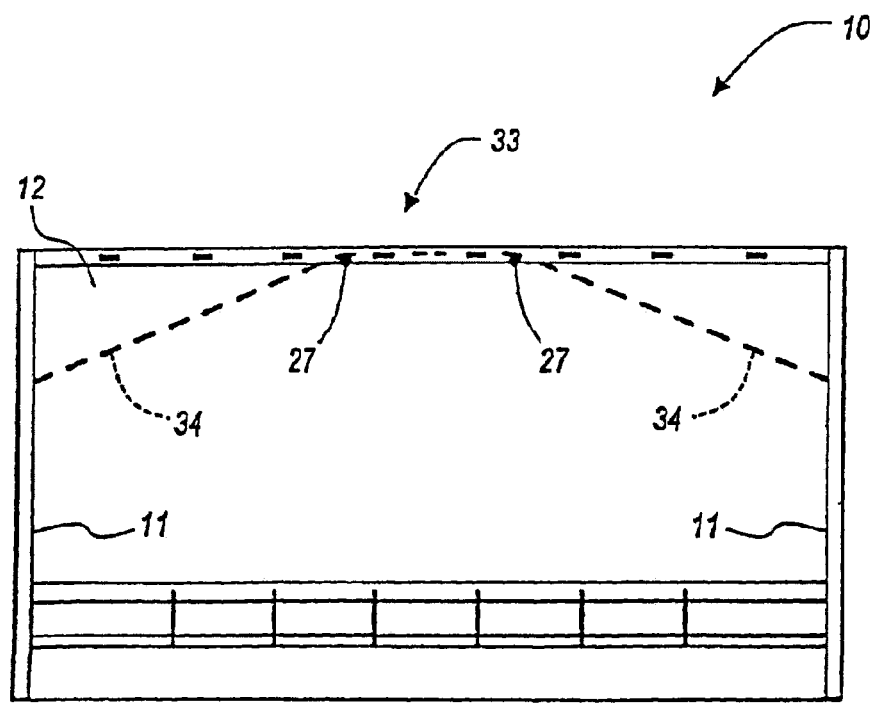
FIG. 11 is an elevational view of the animal feeder showing the dust cover installed therein.
Figure 12:
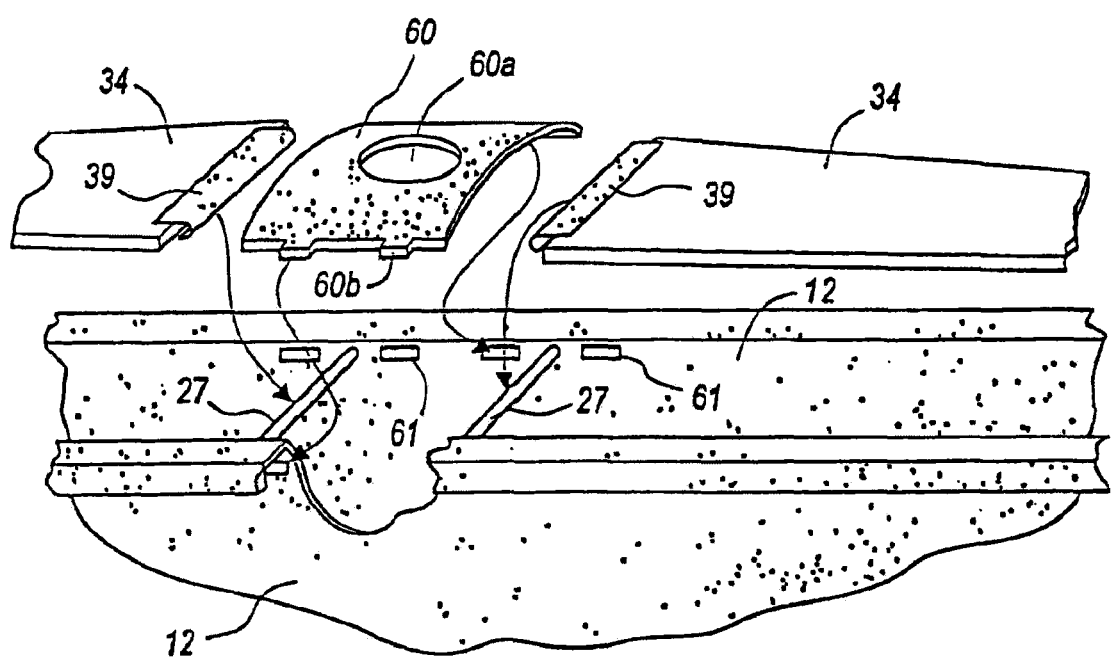
FIG. 12 is an enlarged view showing the support braces and J-shaped brackets for mounting the dust cover panels.

The dust cover 33 is comprised of a pair of generally rectangular panels 34 which are configured and dimensioned to closely fit the interior peripheral edge of the feeder 10 when installed therein as shown in FIG. 11. It will be understood that the feed drop tube holder 60 of the prior art as shown in FIG. 10 functions as a part of the dust cover 33 as described hereinafter in further detail.

The dust cover panels 34 together with the feed drop tube holder 60 are fabricated from a resilient plastic material and are easily removed for cleaning and maintenance purposes.

The dust cover panels 34 are supported in the position shown in FIG. 11 by a pair of generally parallel support braces 27 which extend transversely across the top opening of the feeder 10 interconnecting the downwardly sloping side walls 12.

Braces 27 are configured to support the inner edges of the panels 34 in the position shown in FIG. 11. In the preferred embodiment the inner edges of the dust cover panels 34 are provided with attaching hardware such as J-shaped brackets 39 which are secured to the inner edges of panels 34 by suitable fasteners. J-shaped brackets 39 engage the support braces to 27 to secure the panels 34 as more clearly shown in FIG. 12.

An opposite end portion of the panels 34 are provided with cut-out portions 34a to accommodate the connecting rods 15 disposed along the end walls 11 of the feeder. The insertion of the feed drop tube holder 28 is accomplished as described hereinabove and in U.S. Pat. No. 5,558,039.

It will be appreciated by those skilled in the art that the remaining peripheral edges of the panels 34 are supported by their contact with the downwardly and inwardly converging side walls 12 of the feeder.

In this construction the dust cover 33 functions to reduce the airborne particulates generated by the automatic feed delivery system utilized in conjunction with feeders of this type. Thus, the environment of the production facility is made safer and respiratory hazards are reduced for both man and animal.

Figure 13:
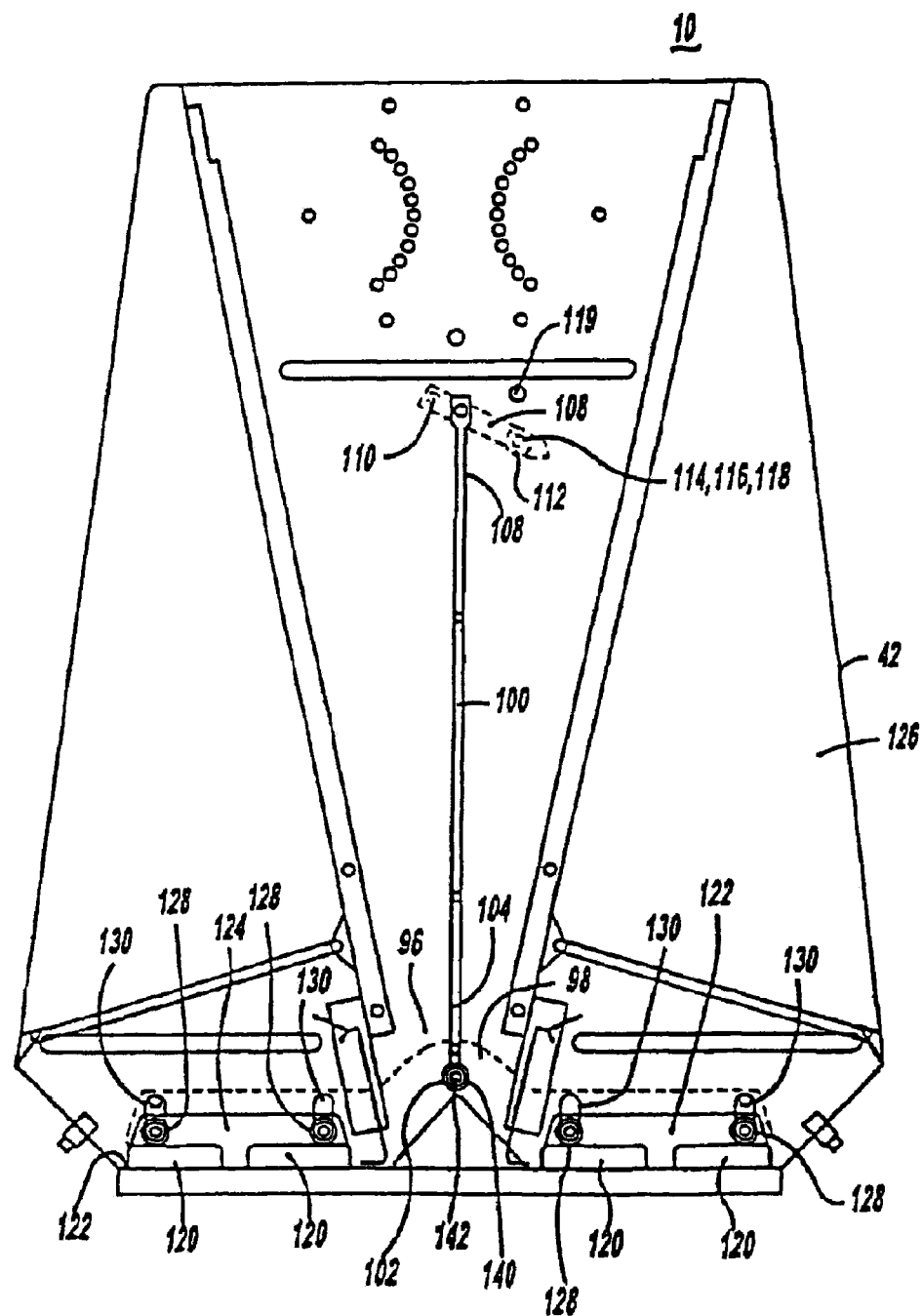
FIG. 13 is a cross-sectional view of the improved feeder of another embodiment of the present invention showing the cleaning mechanism thereof.

Another preferred embodiment of the present invention will be now described with reference to FIG. 13. In this regard, FIG. 13 is a cross-sectional view of the feeder 10 showing the cleaning mechanism 96 incorporated into the feeder 10. The cleaning mechanism 96, which functions to allow easy removal of cleaning fluids and waste feed, is constructed of an adjustable member or outer door 98, a linkage 100 connected to the outer door 98 by a fastener 102 at the bottom end 104 of the linkage 100, as well as to an engagement member or control lever 106. The control lever 106 is connected to the top portion 108 of linkage 100 and is pivotally mounted by the mounting system 110 to end wall 42. The mounting system 110 includes and has a knob 112, lock washer 114, spacer 116, and compression ring 118. The structure and function of the control lever 106 is similar to that of the adjustable control levers 16 as seen in FIGS. 3, 4, 8 and 9. Control lever 106 functions to lift the outer door 98, through linkage 100 to an upward position, to expose four apertures 120.

Figure 18:
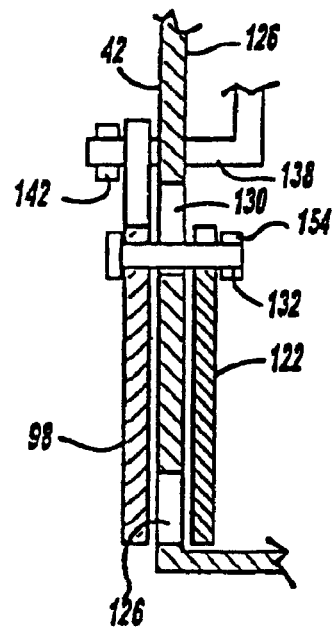
FIG. 18 is a cross-sectional view of the cleaning mechanism of the present invention.

The apertures 120, which are shown in FIG. 13 as being covered by the outer door 98, are elongated rectangular in shape and are located in the end wall 42 adjacent to the bottom surface 123 of the feed trough 55. The outer door 98 covers the apertures 120 and controls the flow of cleaning fluid and waste grain through the apertures 120 during the cleaning of the feeder 10. Further shown in FIG. 13 are the optional, although preferred, first inner door 122 and second inner door 124. These doors are disposed adjacent the inner surface 126 of end wall 42 and are connected to the outer door 98 by through bolts 128. The through bolts 128 pass through the end wall 42 through a plurality of elongated guide slots 130 formed in end wall 42. The first and second inner doors 122, 124 are displaced upwardly and downwardly in conjunction with the outer door 98 as directed by control lever 106. As better seen in FIG. 18, through bolts 128 couple the first inner door 122 by using lock washers 132 and a nut 134. As can be appreciated, the particular fasteners used to movably couple the outer door 98 and the inner doors 122, 124 can take any suitable form known in the fastener art. Further shown in FIG. 18 is the coupling of linkage 100 with the outer door 98. Shown is the linkage rod tip portion 136 which is disposed through an elongated slot 138 formed in end wall 42. The linkage rod tip portion 136 is located through hole 140 in the outer door 98 and is fastened by a fastener 142.

Figure 14:
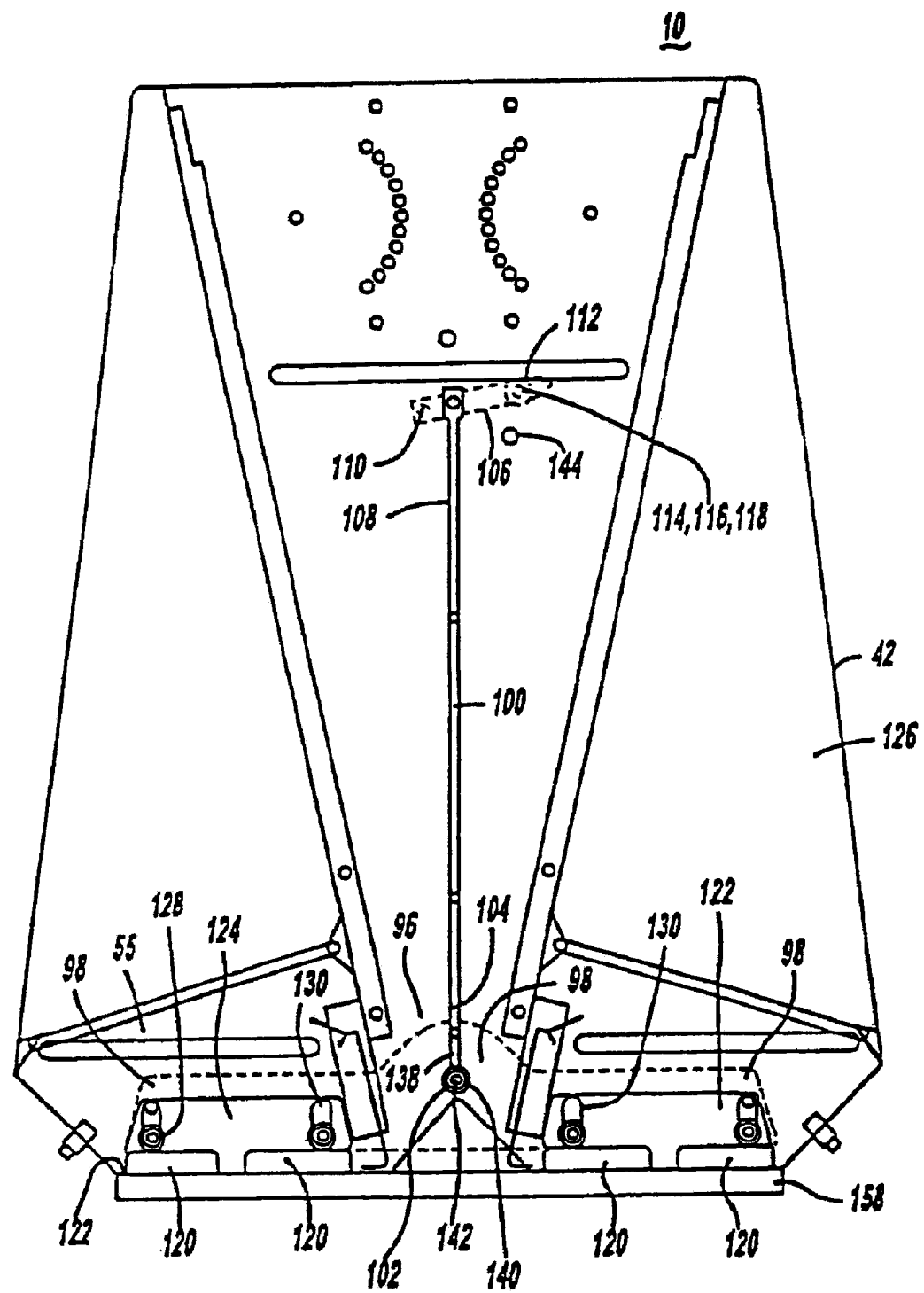
FIG. 14 is a cross-sectional view of the improved feeder shown in FIG. 13 illustrating actuation of the cleaning mechanism.

FIG. 14 shows the cleaning mechanism 96 in its raised position. Control lever 106 is depicted as being raised and engaged in an index member or indexing hole 144. In normal operation, the user of the feeder 10 adjusts the cleaning mechanism 96 by grasping and pulling knob 112 outwardly from an engaged position and pivoting the control lever 106 upwardly or downwardly to adjust the outer door 98 to the desired vertical position. After the desired position or indexing hole 144 is selected, the knob 112 is released. The function of the control lever 106 and knob 112 is similar to that as previously described in the descriptions of FIGS. 8 and 9.

Figure 15:
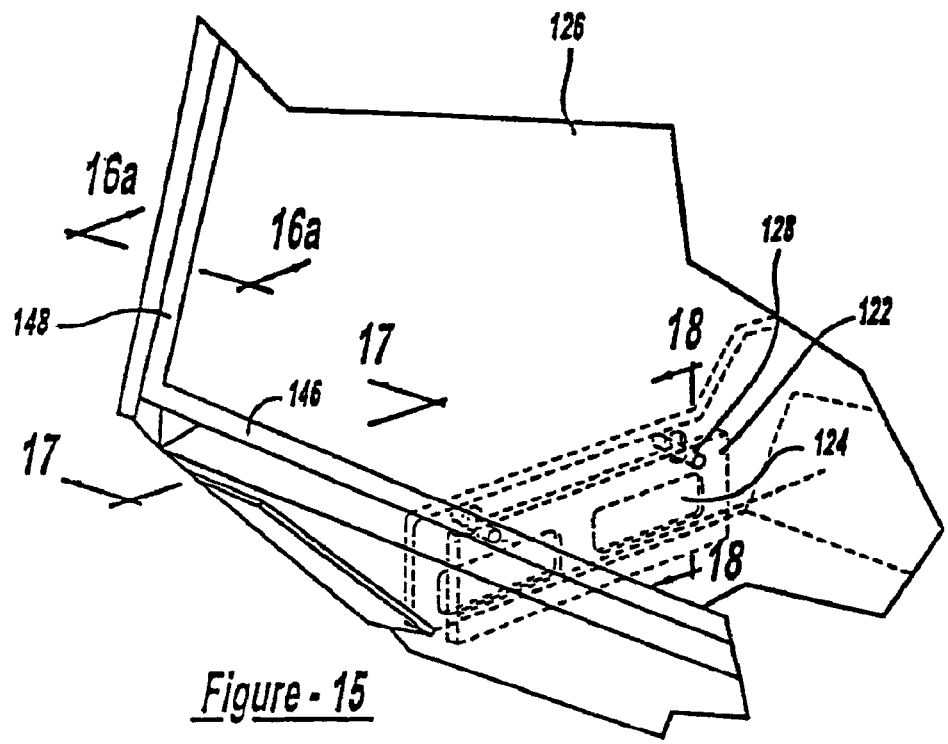
FIG. 15 is a sectional view of the cleaning mechanism and improved flanges of the improved feeder shown in FIG. 14.
Figure 16A:
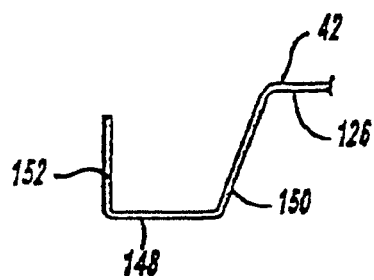
FIGS. 16a and 16b are cross-sectional views of the flanges of the opposing end walls of the present invention taken through 16-16 of FIG. 15.
Figure 16B:
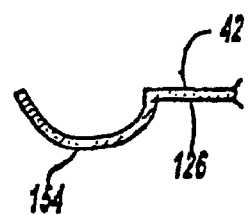
Figure 17:
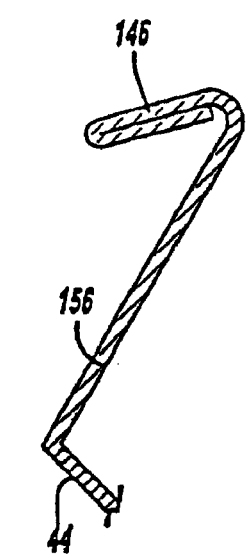
FIG. 17 is a cross-sectional view of the flanges of the trough portion taken through 17-17 of FIG. 15.

FIG. 15 is a sectional view of the cleaning mechanism 96 and improved flanges of the current invention. The improved flange portions allow for easier cleaning of the feeder as well as increased comfort to the feeding animals. Disposed on the opposing end side 42 is a ledge 148 generally parallel to the inner surface 126 of opposing end wall 42. Ledge 148 functions to reduce harmful contact to the feeding animals by providing an increased surface area of contact with the feeding animal. As better seen in FIG. 16a, the ledge 148 is connected to end wall 42 by a flange 150, the outer surface being closed off by a flange 152. Flange 148 has a width from one-half (½") to one (1") inch, and preferably five-eighths (⅝") inch. The flange design allows for the proper stiffening and support of end wall 42 as well as reducing the discomfort to animals which may be forced into the edge. The design also allows for easy stacking of the feeder component materials. An alternate design can be seen in FIG. 16b, which shows a curved portion 154 joined to the end wall 42.

FIG. 15 further shows a ledge 146 extending outwardly from the outer trough portion 44. The outwardly extending flange 146 is connected to the outer trough portion 44 by transition flange 156. The configuration of the outwardly extending flange 146 and transition flange 156 reduces the number of unexposed surfaces, resulting in better access to the trough 55 surfaces by a stream of cleaning fluid. Conventional feeders typically have flat trough 55 bottom surfaces 123. To assist in the removal of the cleaning fluids, it is optionally possible to adjust the support structure 158 (shown in FIG. 14) so that the bottom surface 123 of the trough 55 is angled down toward the apertures 120 to assist in the drainage of the cleaning fluids.

The method of utilizing the aforementioned cleaning mechanism will now be discussed in detail. A feeder 10 is provided having cleaning mechanism 96 consisting of a plurality of apertures 120 covered by an outer door 98. The outer door 98 is coupled to a control lever 106 which is pivotably mounted to the side of the feeder 10. The control lever 106, which has a knob 112, is adjustable through a plurality of index positions 144 allowing for the raising and lowering of the outer door 98.

When it is desirable to clean the feeder, the operator will grasp the knob 112 and raises the control lever 106 to a raised index hole 144, moving the outer door 98 to expose at least a portion of the aperture 120. The knob 112 is then released locking the control lever 106 in its upward position. The feeder 10 is then exposed to a stream of high pressure water, washing and rinsing the surfaces of the feeder 10. It is preferred that the operator use the stream high pressure water to "push" the fluids and waste feed out of the trough 55 through the apertures 120. It is envisioned that the control lever 106 will be left in its raised position until the trough 55 is substantially free of cleaning fluid. When the trough 55 has been cleaned, the operator grasps the knob 112 and moves it downward so the outer door 98 covers the aperture 120.

Figure 19:
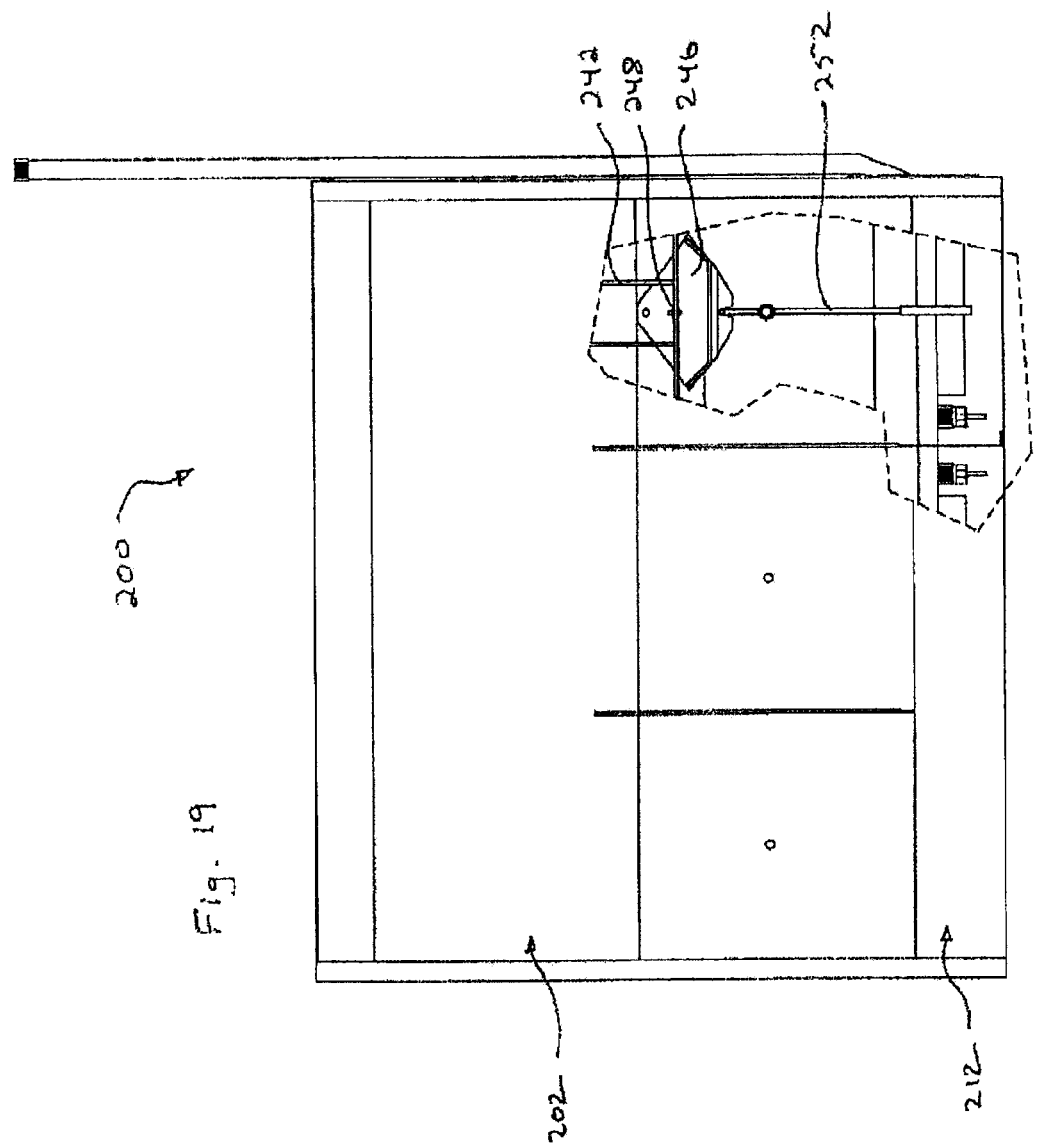
FIG. 19 is an elevational view of an alternate embodiment of the improved feeder showing the feed-dispensing mechanism thereof.
Figure 20:
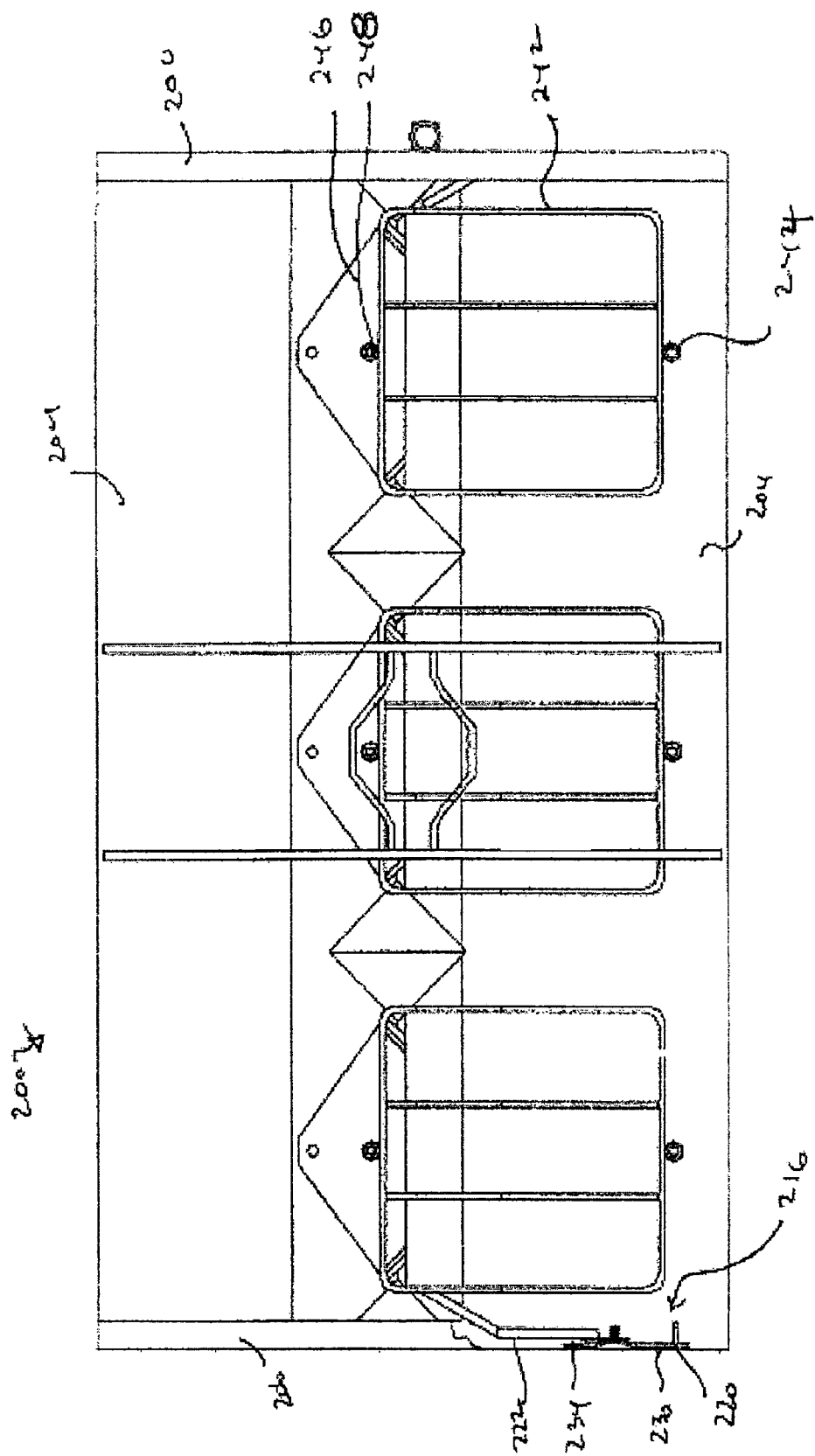
FIG. 20 is a top view of the feeder illustrated in FIG. 19.
Figure 21:
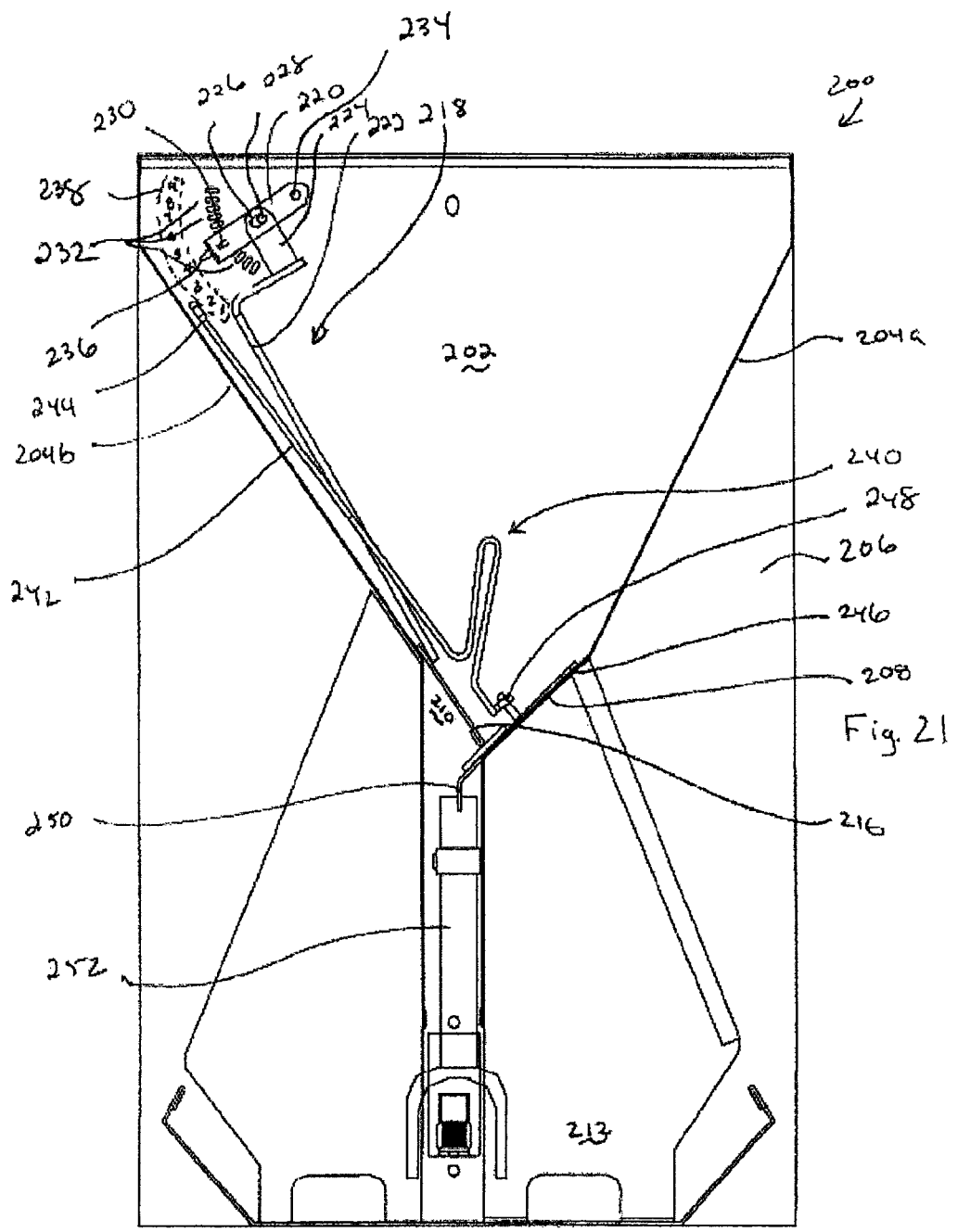
FIG. 21 is a cross-sectional view taken along line XXI-XXI shown in FIG. 20.

Another preferred embodiment of the present invention will now be described in reference to FIGS. 19-21 in which the feed hopper and feed gate are located in a position remote from the feed trough, thereby minimizing the likelihood of contamination of the feed reservoir from the feed trough. The animal feeder generally indicated at 200 includes an open top hopper 202 defined by opposing, downwardly sloping sidewalls 204 and opposing substantially vertical end walls 206. One of the side walls 204a includes a ledge region 208, whereas the other side wall 204b terminates at a position above and spaced apart from the ledge 208. An opening 210 is defined between the ledge 208 and sidewall 204b. A feed trough 212 is defined by end walls 206 extending downwardly below feed hopper 202 and outer panels 214 extending therebetween. In this manner, the feed trough 212 is formed in a location remote from the feed hopper 202 and feed gate opening 210.

A feed gate 216 is interposed between sidewall 204b and ledge 208. The feed gate 216 is selectively positionable for adjusting the feed opening for feed hopper 202. In this regard, a feed dispensing mechanism 218 is provided which includes a control lever 220 and a control rod 222 interconnecting the control lever 220 with the feed gate 216. The control lever 220 is similar to the control lever 16 described with reference to the other embodiments disclosed herein. In this regard, the control lever 220 is pivotally mounted on the interior surface of an end wall 206 by use of suitable attaching hardware such as a pivot screw, lock washer, spacer and compression spring.

The opposite end of connecting rod 222 is configured to couple with feed gate 216 in a conventional manner. To provide a non-binding linkage between the control lever 220 and the feed gate 216 which facilitates operation of the dispensing mechanism when the feeder is filled. The control rod 222 has a flange 224 formed on an end opposite the feed gate 216. The flange 224 includes a loss motion slot 226 which receives a fastener 228 for coupling the control rod 222 with the control lever 220.

The feed dispensing mechanism 218 further includes an index pin 230 extending from the control lever 220 towards the end wall 206 for mating engagement with an array of index holes 232 which are regularly disposed at regular intervals along an arc concentric with a pivot screw 234 pivotally coupling the control lever 220 to the end wall 206. In this manner, the index pin 230 may be selectively located within any one of the arrays of holes 232 for selectively locating the feed dispensing mechanism 218 in a series of discrete positions. Furthermore, the slot 226 formed in flange 224 allows the feed gate 216 to move within a limited range of motion about each of the discrete positions.

In normal operation, the feed dispensing mechanism 218 adjusts the location of the feed gate 216 when the control lever 220 is grasped and pulled such that index pin 230 disengages hole 232 allowing the control lever 220 to rotate to a new position. The control lever 220 is pivotally rotated such that a different hole 232 is selected within the array, thereby adjusting the position of feed gate 216. After the desired hole 232 is selected, the lever 220 is re-positioned again such that the index pin 230 engages the hole 232 for fixing the feed dispensing mechanism 218 in a new location.

It will be appreciated that the control lever 220 may be provided with a pointer 236 which corresponds with a series of numbered indicia 238. These indicia 238 indicate a predetermined rate for dispensing feed from the hopper 202 into the feed trough 212. Feeder 200 further includes a feed agitation mechanism 240 disposed within hopper 202. The feed agitation mechanism 240 functions to agitate feed within the hopper 202 for avoiding a bridging condition whereby the feed is blocked from being dispensed out of the opening 210. Feed agitation mechanism 240 includes agitation grate 242 loosely secured to side wall 204b at a first end 244 and an agitator plate 246 located adjacent the inner surface of ledge 208. Second end 248 of agitation grate 244 is loosely coupled to agitator plate 246. A flange 250 extends from agitator plate 246 and is coupled to an actuator 252 which extends downward into feed trough 212. As an animal feeds at feeder 200, it bumps or pushes on actuator 252 causing agitator plate 246 to move or jiggle within hopper 202. Such relative movement of agitator plate 246 causes agitation grate 242 to move within hopper 202. Slight relative motion creates sufficient agitation for causing any feed which may be bridging across the opening 210 to break loose and fall down to the lower portion of hopper 202. At this location, the feed may be freely dispensed from the feed hopper into the feed trough 212.

In this manner, the present invention provides an animal feed dispenser with an indexed feed mechanism which allows for precise control of the feed gate opening. Furthermore, the present disclosure provides an agitation mechanism which prevents the bridging of feed across the feed gate opening, thereby affording proper flow of feed from the feed hopper 202 to the feed trough 212.

The terms "top", "bottom", "side", and so forth have been used herein merely for convenience to describe the present invention and its parts as oriented in the drawings. It is to be understood, however, that these terms are in no way limiting to the invention since such invention may obviously be disposed in different orientations when in use.

From the above it can be seen that the improved animal feeder of the present invention provides an adjustable dispensing mechanism for the accurate delivery of feed to livestock animals. The dispensing mechanism includes standardized controls and settings to enable a precise amount of feed to be delivered to animals during specific stages of their life cycle to ensure optimum growth rates.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An animal feeder comprising:
   a feed hopper including a feed gate opening;
   a feed gate movable relative to said feed gate opening between a plurality of positions; and
   a feed gate mechanism connected to said feed hopper and said feed gate and configured to move said feed gate relative to said feed gate opening, said feed gate mechanism includes a first member mounted for pivotable motion relative to said feed hopper and a second member connected to said first member and said feed gate and transmitting motion of said first member to said feed gate, wherein one of said first and second members includes a third member slidably engaging a slot formed in the other of the first and second members and allowing limited movement of said second member and said feed gate about each of said plurality of positions.

2. The animal feeder of claim 1, further comprising:
   an agitation element at least partially disposed within said feed hopper; and
   an actuator coupled to said agitation element and configured to move said agitation element relative to said feed hopper.

3. The animal feeder of claim 2, wherein said actuator extends through said feed gate opening.

4. The animal feeder of claim 2, further comprising a trough positioned to receive feed from said feed gate opening, wherein at least a portion of said actuator is disposed in said trough.

5. The animal feeder of claim 1, wherein said feed gate mechanism includes a plurality of discrete adjustment positions, each of said plurality of discrete adjustment positions corresponding to one of said plurality of positions of said feed gate.

6. The animal feeder of claim 1, wherein said feed hopper includes a plurality of feed gate openings and a plurality of corresponding feed gates, each of said plurality of feed gates being independently movable relative to said feed gate openings.

7. The animal feeder of claim 1, further comprising a cleaning gate assembly including a gate member and a linkage operably connected to said gate member to position said gate member relative to said feed gate opening.

8. An animal feeder comprising:
a feed hopper including a discharge opening having first and second portions;
a feed gate movable relative to said discharge opening between a plurality of positions and including a first end corresponding to said first portion of said discharge opening and a second end corresponding to said second portion of said discharge opening; and
first and second feed gate mechanisms connected to said first and second ends of said feed gate, respectively, and independently movable between a plurality of discrete positions to independently control positioning of said first and second ends of said feed gate, respectively, relative to said first and second portions of said discharge opening, respectively.

9. The animal feeder of claim 8, further comprising:
an agitation element at least partially disposed within said feed hopper; and
an actuator coupled to said agitation element and configured to move said agitation element relative to said feed hopper.

10. The animal feeder of claim 9, wherein said actuator extends through said feed gate opening.

11. The animal feeder of claim 9, further comprising a trough positioned to receive feed from said feed gate opening, wherein at least a portion of said actuator is disposed in said trough.

12. The animal feeder of claim 8, further comprising a cleaning gate assembly including a gate member and a linkage operably connected to said gate member to position said gate member relative to said first and second discharge openings.

13. The animal feeder of claim 8, wherein at least one of said first and second feed gate mechanisms include a first member mounted for pivotable motion relative to said feed hopper and a second member connected to said first member and said feed gate and transmitting motion of said first member to said feed gate, wherein one of said first and second members includes a third member slidably engaging a slot formed in the other of the first and second members and allowing limited movement of said second member and said feed gate about each of said plurality of positions.

14. The animal feeder of claim 8, wherein said plurality of positions of said feed gate include a plurality of first discrete positions of said first end and a plurality of second discrete positions of said second end.

15. An animal feeder comprising:
a feed hopper including a feed inlet, a feed outlet, and a sidewall having a plurality of apertures arranged in a curved array;
a feed gate movable relative to said feed outlet between a plurality of discrete adjustment positions;
an arm mounted to said sidewall and pivotable relative thereto about a pivot axis, said arm including a pin selectively engageable with any of said plurality of apertures; and
a rod pivotably connected to said arm between said pivot axis and said pin and transmitting motion of said arm to said feed gate to move said feed gate between said plurality of discrete adjustment positions.

16. The animal feeder of claim 15, further comprising a scale including a plurality of indicia, each of said plurality of indicia being associated with a corresponding one of said plurality of apertures.

17. The animal feeder of claim 15, wherein said arm and said rod are slidably engaged with each other to allow limited movement of said rod and said feed gate about each of said plurality of discrete adjustment positions.

18. The animal feeder of claim 15, further comprising an agitation mechanism including an agitator plate at least partially disposed within said feed hopper, an agitation grate extending from said agitator plate, and an actuator connected to said agitator plate and extending through said feed outlet, said actuator being movable relative to said feed hopper and transmitting motion to said agitator plate.

19. The animal feeder of claim 18, further comprising a feed trough adapted to receive animal feed from said feed hopper, said actuator extending into said feed trough.

20. The animal feeder of claim 15, further comprising a cleaning gate assembly including a gate member and a linkage operably connected to said gate member to position said gate member relative to said feed gate opening.

* * * * *